(12) United States Patent
Takeda

(10) Patent No.: US 7,095,691 B2
(45) Date of Patent: Aug. 22, 2006

(54) OPTICAL DISK DEVICE

(75) Inventor: Naoto Takeda, Tokyo (JP)

(73) Assignee: TEAC Corporation, Musashino (JP)

( * ) Notice: Subject to any disclaimer, the term of this patent is extended or adjusted under 35 U.S.C. 154(b) by 452 days.

(21) Appl. No.: 10/232,477

(22) Filed: Aug. 29, 2002

(65) Prior Publication Data

US 2003/0043714 A1    Mar. 6, 2003

(30) Foreign Application Priority Data

Aug. 30, 2001   (JP) ............................. 2001-260739
Aug. 30, 2001   (JP) ............................. 2001-260740

(51) Int. Cl.
    *G11B 7/00*   (2006.01)
(52) U.S. Cl. ................. 369/47.53; 369/59.11; 369/116
(58) Field of Classification Search ............ 369/44.31, 369/53.26, 53.27, 47.52, 59.11, 116, 47.53
    See application file for complete search history.

(56) References Cited

U.S. PATENT DOCUMENTS

| | | | |
|---|---|---|---|
| 5,412,626 A | | 5/1995 | Ohno et al. |
| 5,526,577 A | * | 6/1996 | Nix .......................... 369/53.27 |
| 5,602,814 A | * | 2/1997 | Jaquette et al. .......... 369/47.53 |
| 6,222,815 B1 | * | 4/2001 | Nagano ................... 369/47.51 |
| 6,320,832 B1 | * | 11/2001 | Nakao et al. ............ 369/47.53 |
| 6,859,426 B1 | * | 2/2005 | Ogawa et al. ........... 369/47.53 |

FOREIGN PATENT DOCUMENTS

| | | |
|---|---|---|
| JP | 05-325240 A | 12/1993 |
| JP | 6-12674 | 1/1994 |
| JP | 09-288827 | 11/1997 |
| JP | 10-106009 A | 4/1998 |
| JP | 2000-182244 A | 6/2000 |
| JP | 2001-143263 | 5/2001 |

\* cited by examiner

*Primary Examiner*—Wayne Young
*Assistant Examiner*—Van Pham
(74) *Attorney, Agent, or Firm*—Christensen O'Connor Johnson Kindness PLLC

(57) ABSTRACT

The present invention provides a data-recordable optical disk device. Test data is recorded in a predetermined area of an optical disk while varying recording power level, and an optimum recording power level is selected based on reproduced signal quality of the test data. When the optimum recording power level does not exceed an allowable recording power level of the laser diode, data is recorded at that optimum recording power level. When the optimum recording power level exceeds the allowable recording power level of the laser diode, the recording strategy is changed to a low-power strategy. A low-power strategy is, for example, a strategy having an increased recording pulse width compared to that of a standard strategy. An optimum recording power level is selected for the low-power strategy, and data is subsequently recorded.

11 Claims, 16 Drawing Sheets

OPTICAL DISK DEVICE

BACKGROUND OF THE INVENTION

1. Field of the Invention

The present invention relates to an optical disk device, and more particularly to optimization of power level for recording data on a writable optical disk.

2. Description of the Related Art

Optimum Power Control (OPC) is a known technique to optimize recording power level by recording test data on a predetermined area (PCA area) of a writable optical disk, reproducing the data, and evaluating reproduced signal quality.

Nevertheless, due to temperature change within an optical disk drive or quality variance of a laser diode (LD), a recording power level yielding the optimum value of reproduced signal quality may exceed the maximum allowable power level of the laser diode. In such a case, recording cannot be performed at the actual optimum recording power level. Recording must instead be carried out at the maximum allowable power level of the LD, which is lower than the optimum power level.

Japanese Patent Laid-Open Publication No. Hei 9-288827, for example, discloses maintaining recording quality by adjusting the rotational frequency of an optical disk during data recording, when, upon conducting OPC, the optimum recording power level exceeds the maximum allowable power level of the LD. Specifically, when the optimum recording power level determined by OPC exceeds the maximum allowable power level of the LD, the rotational frequency is adjusted so as to be lower according to:

$$f'=f \cdot (Plim/Po)^2$$

Here, f' is the rotational frequency after the adjustment, f is the normal rotational frequency before the adjustment, Plim is the maximum allowable power level, and Po is the optimum power level. By reducing the rotational frequency in this manner, data can be recorded at the optimum power level lowered to match the maximum allowable power level.

However, it is generally difficult to control the rotational frequency with high accuracy. Moreover, reduction of rotational frequency leads to decrease in recording speed, making it difficult to fulfill the demands for high-speed recording.

Japanese Patent Laid-Open Publication No. 2001-143263 describes a technique in which, when the recording pulse comprises a leading pulse and a subsequent pulse array, OPC is performed while simultaneously varying duty and recording power conditions for the leading pulse and the subsequent pulse array, so as to search for the recording condition yielding minimum jitter. This technique is disadvantageous in that the OPC processing is complex, basically requiring test recordings to be performed for the number of possible combinations of three parameters.

SUMMARY OF THE INVENTION

The object of the present invention is to provide an optical disk device which can record data without reducing recording speed even when the optimum recording power level exceeds the maximum allowable power level.

According to the present invention, a data-recordable optical disk device comprises test data recording means for recording test data in a predetermined area of an optical disk while varying recording power level, test data reproducing means for reproducing the test data, recording power level setting means for setting an optimum recording power level based on reproduced signal quality of the test data, data recording means for recording data based on the optimum recording power level, and strategy setting means for setting a recording strategy for the test data and the data. When the optimum recording power level determined based on recording of the test data using a first recording strategy does not exceed an allowable recording power level, the strategy setting means sets the first recording strategy as a recording strategy for the data. When, in contrast, the optimum recording power level exceeds the allowable power level, the strategy setting means sets a second recording strategy as a recording strategy for the test data and the data. The second recording strategy is different from the first recording strategy, and is such that an optimum recording power level for the second recording strategy does not exceed the allowable recording power level.

Further, an optical disk device according to the present invention comprises means for recording test data while varying recording power level, using a standard strategy and a low-power strategy requiring less recording power compared to the standard strategy, means for reproducing the test data recorded using the standard strategy and the low-power strategy, means for selecting a first optimum recording power level based on reproduced signal quality of the test data recorded using the standard strategy, means for selecting a second optimum recording power level based on reproduced signal quality of the test data recorded using the low-power strategy, means for comparing the first optimum recording power level with an allowable power level, and means for recording data which records data using the first optimum recording power level when the first optimum recording power level does not exceed the allowable power level, and records data using the second optimum recording power level when the first optimum recording power level exceeds the allowable power level.

Moreover, an optical disk device according to the present invention includes means for setting a strategy, means for recording test data using a standard strategy, means for reproducing the test data, means for setting a tentative optimum recording power level based on reproduced signal quality of the test data, means for comparing the tentative optimum recording power level with an allowable power level, and means for setting recording power level which sets the tentative optimum recording power level as an authentic optimum recording power level when the tentative optimum recording power level does not exceed the allowable power level, and, when the tentative optimum recording power level exceeds the allowable power level, performs re-recording of the test data and resetting of optimum recording power level by setting a low-power strategy requiring less recording power compared to the standard strategy until the tentative optimum recording power level becomes no higher than the allowable power level.

An optical disk device according to the present invention further comprises means for detecting intensity of a returned recording laser beam from an optical disk when recording data using a first recording strategy, control means for controlling recording power level such that the returned light intensity matches a target value, and means for changing the first recording strategy to a second recording strategy requiring less recording power when a recording power level required for the returned light intensity to match the target value exceeds an allowable power level.

In one embodiment of the present invention, the second recording strategy or the low-power strategy is a strategy having an increased recording pulse time width compared to that of the first recording strategy or the standard strategy. By increasing the pulse time width, more energy can be applied to a recording film of the optical disk, allowing the recording power level to be reduced. The optimum recording power level can thereby be set lower than the allowable power level.

The present invention may be employed for adjustment of recording power by OPC (Optimum Power Control) and ROPC (Running Optimum Power Control). Each of OPC and ROPC may be executed individually, or alternatively, OPC and ROPC may be performed at the same time. More specifically, OPC may be executed to set an optimum recording power level, and this optimum recording power level can be further adjusted by ROPC. The present invention can be practiced in an optical disk device executing only OPC, an optical disk device, executing only ROPC, and an optical disk device performing both OPC and ROPC.

The present invention will be understood more clearly by referring to the embodiments described below. However, the scope of the present invention is not limited to the following embodiments.

PREFERRED EMBODIMENTS OF THE INVENTION

Figure 1:
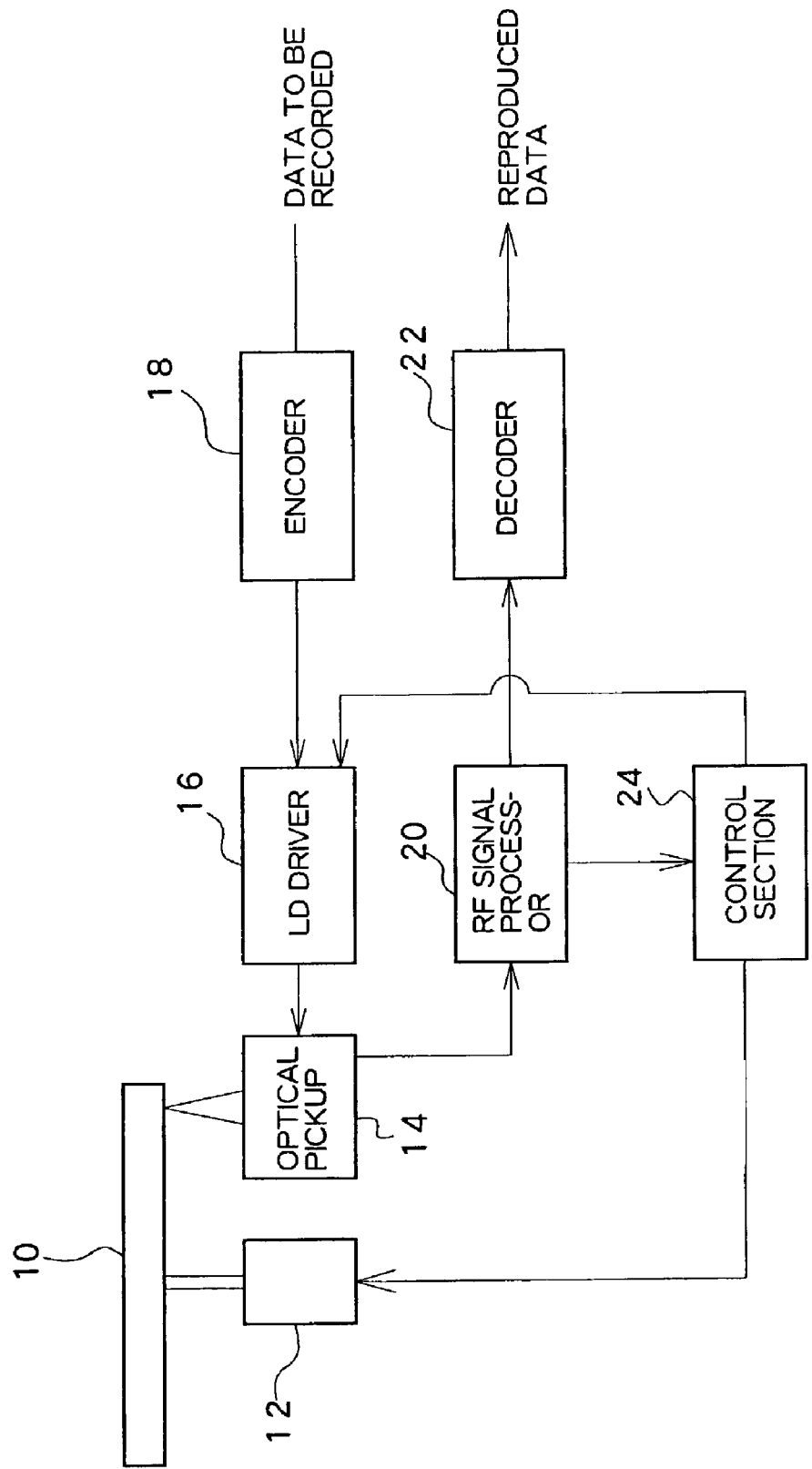
FIG. 1 is a block diagram showing a configuration of an optical disk device.

Embodiments according to the present invention are next described by referring to the drawings.

FIG. 1 is a block diagram showing a configuration of main parts of an optical disk device according to an embodiment of the present invention. An optical disk 10 is CAV- or CLV-controlled by a spindle motor 12.

An optical pickup 14 is provided opposing the optical disk 10. The optical pickup 14 emits a laser beam from a laser diode (LD) at a recording power level to record data on the optical disk 10. The data may be recorded by forming a pit by melting and sublimating a portion of a recording film of the optical disk 10. Heating and quenching may be performed on a crystal state for transition into an amorphous state.

When recording data, data to be recorded is supplied to an encoder 18. The data encoded by the encoder 18 is next supplied to an LD driver 16. The LD driver 16 generates a driving signal based on the encoded data, and supplies the signal to the LD of the optical pickup 14. Further, the LD driver 16 receives a control signal from a control section 24. This control signal determines a recording strategy and a recording power level.

When reproducing data, the LD of the optical pickup 14 irradiates a laser beam at a reproducing power level (reproducing power level<recording power level). The LD then receives the reflected light so as to transform the light into an electric signal, thereby generating a reproduced RF signal. The reproduced RF signal is supplied to a reproduced RF signal processor 20.

The reproduced RF signal processor 20 comprises components such as an amplifier, an equalizer, a binarizer, and a PLL. The reproduced RF signal processor 20 binarizes the reproduced RF signal and generates a synchronizing clock, both for supply to a decoder 22. The decoder 22 decodes the data based on these supplied signals and outputs decoded data as reproduced data to a personal computer or the like.

The reproduced RF signal from the reproduced RF signal processor 20 is also supplied to the control section 24 for signal quality evaluation. It is to be noted that, when reproducing data, other circuits may be used such as a circuit for generating a tracking error signal or a focus error signal to control a focus servo or a tracking servo, and a circuit for reproducing a signal reflecting a wobble formed in the optical disk 10 for use in address demodulation or control of rotational frequency. However, as these circuits are identical to those found in a conventional optical disk device, explanation of these circuits is omitted.

The control section 24 not only drives the LD driver 16 to execute OPC, but also evaluates the signal quality of each recorded test data to determine an optimum recording power level. Specifically, the control section 24 performs OPC using a predetermined recording strategy, and then calculates an optimum power level. When this optimum power level does not exceed the maximum allowable power level of the LD, recording is conducted using the present recording strategy and optimum power level. Only when the optimum power level exceeds the maximum allowable power level of the LD, is the recording strategy changed, and a search is conducted again for an optimum power level. By changing the recording strategy when the optimum power level exceeds the maximum allowable power level, high-quality data recording can be achieved through simple OPC processing.

The optical disk device of the present embodiment is configured as above. A detailed explanation is next given concerning the processing in the control section 24 for determining an optimum recording power level.

Figure 2:
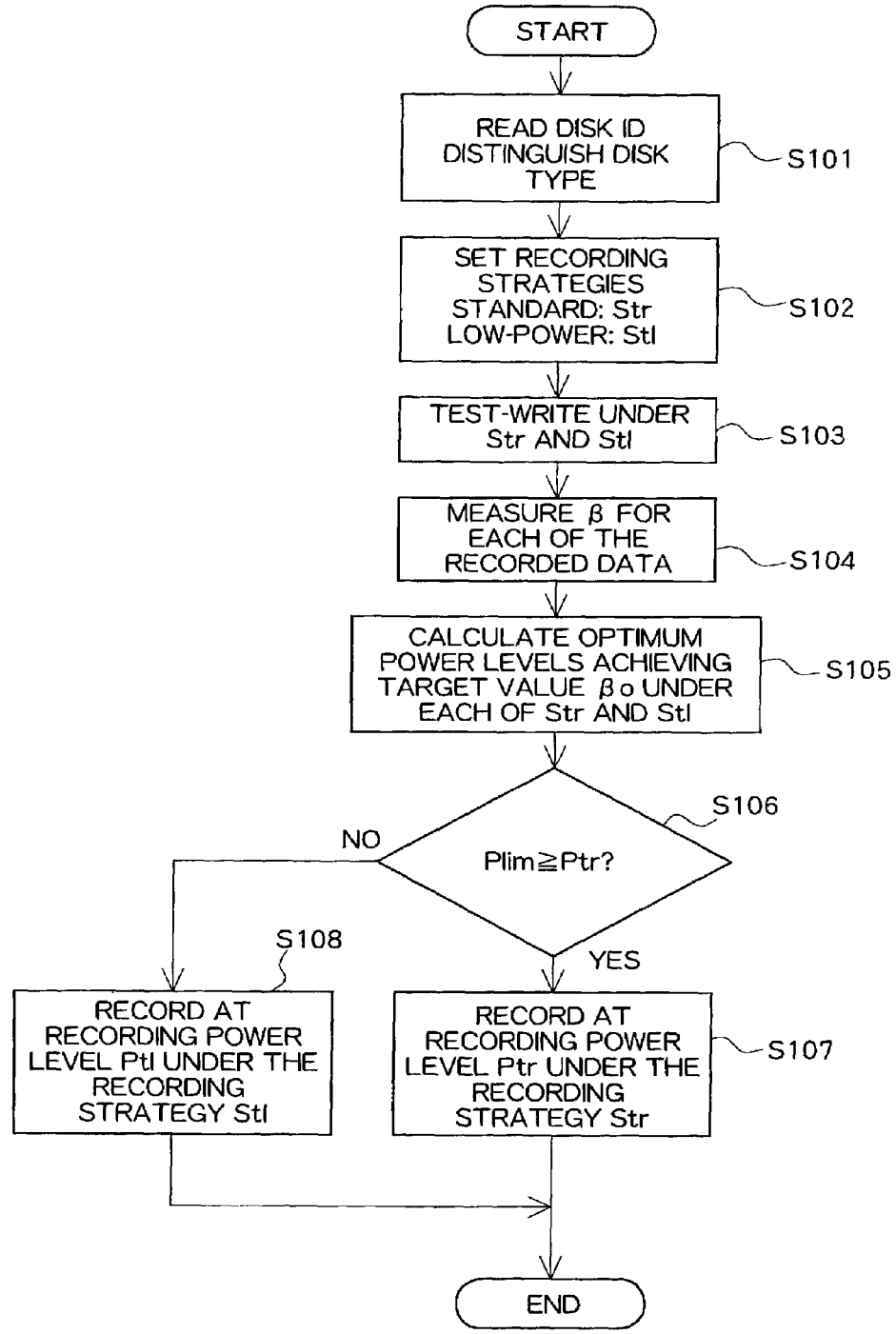
FIG. 2 is a flowchart showing overall processing.

FIG. 2 is a flowchart showing processing in the control section 24. The control section 24 first reads, according to a reading signal from the optical pickup 14, a disk ID written in advance in a predetermined area of an optical disk 10, so as to distinguish types of optical disk 10. Types of optical disk 10 to be distinguished are the different sorts such as CD-R, RW, and DVD-R, and the manufacturer of the disk. The present embodiment will be explained for a case of DVD-R, for example. When recording conditions such as a target value for reproduced signal quality are written in the optical disk 10, these conditions are also reproduced and stored in a memory of the control section 24. In the present embodiment, the target value is β value of a reproduced signal.

After distinguishing the type of the optical disk 10, the control section 24 sets recording strategies for use in recording data (S102). According to the present embodiment, a recording strategy is not selected by going through each one of a large number of possible combinations. Instead, a standard strategy Str and a low-power strategy Stl are set. The standard strategy Str is determined based on the disk ID read in S101. The low-power strategy Stl is obtained by modifying the standard strategy Str.

Figure 3A:
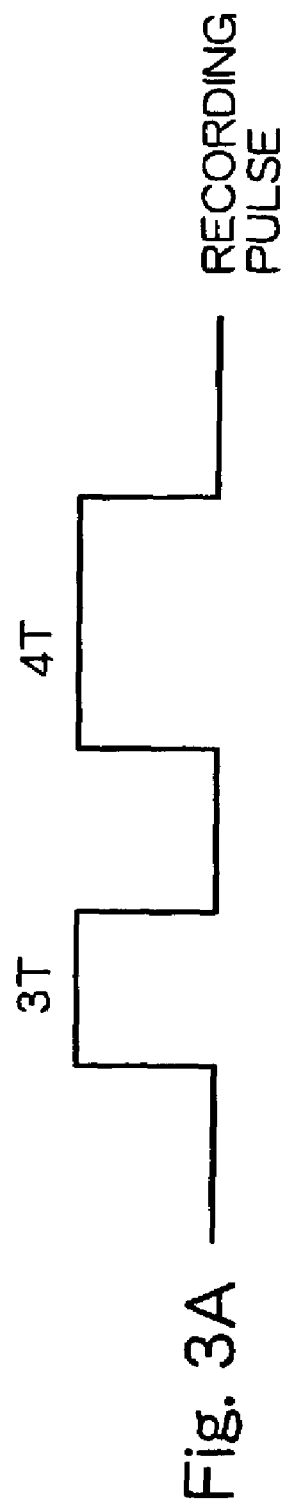
FIG. 3A is a timing chart of a recording pulse waveform.
Figure 3B:
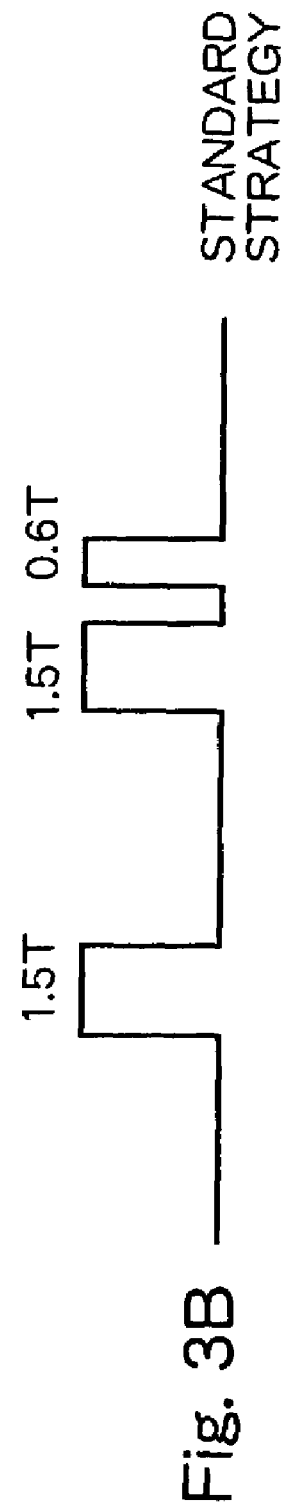
FIG. 3B is a timing chart of a standard strategy.

FIGS. 3A and 3B partially illustrate the strategy setting step of S102. FIG. 3A shows a recording pulse supplied from the encoder, and includes a 3T signal and a 4T signal, for example. FIG. 3B indicates the standard recording strategy Str in which, with respect to 3T and 4T, the following pulse widths are assigned, respectively:

3T→1.5T

4T→1.5T+0.6T

Data is recorded using such a pulse signal to drive the LD. It is to be noted that a single pulse is assigned to 3T, while a plurality of pulses (pulse array) are used to record data in 4T. The leading pulse of the pulse array has a time width of 1.5T, and the subsequent pulse has a time width of 0.6T. While two pulses are used to record data in 4T in this example, a case may similarly exist in which, for a signal of 5T or more, a pulse array including more than three pulses is used to record data according to necessity. Generally, a standard strategy is a strategy set for each type of optical disk and manufacturer.

Figure 3C:
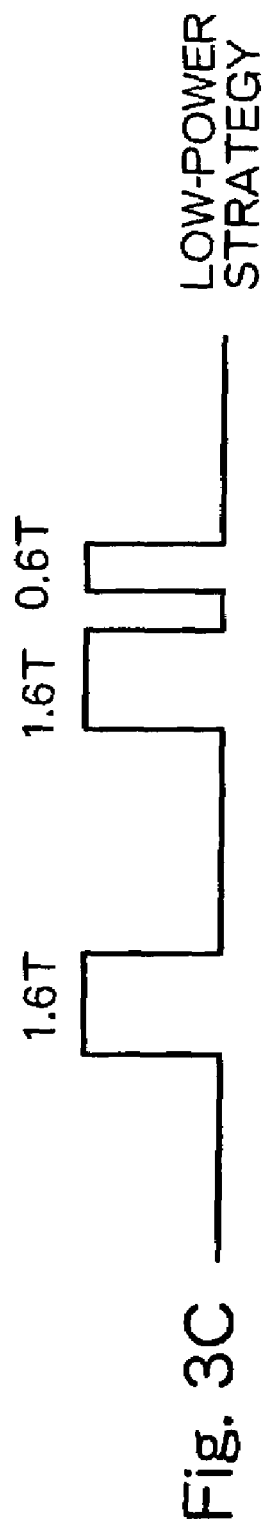
FIG. 3C is a timing chart of a low-power strategy.

FIG. 3C indicates the low-power recording strategy Stl. The pulse widths of the low-power recording strategy Stl are increased compared to those in the standard recording strategy Str. Specifically, with respect to the 3T signal, the pulse width is increased as indicated below:

1.5T→1.6T

For the 4T signal, the width of the leading pulse is increased as below:

1.5T→1.6T

By increasing the pulse time widths in this way, an increased amount of laser beam energy can be applied to the optical disk 10, thereby requiring less recording power to form an identical pit. A "low-power strategy" is a strategy which, in the above-described manner, requires less recording power of the LD to form an identical pit compared to the standard strategy. A low-power strategy may be obtained by increasing the pulse width of the standard strategy as described above. The increase amount may be predetermined or can be appropriately adjusted as described later.

Returning to FIG. 2, after setting the standard strategy Str and the low-power strategy Stl as described above, the control section 24 uses the standard strategy Str and the low-power strategy Stl to conduct test recording (S103). When 16 sectors exist in the PCA area of the optical disk 10, for example, test recording can be performed using the standard strategy Str in the first eight sectors and using the low-power strategy Stl in the remaining eight sectors.

After conducting the test recording under two strategies Str and Stl while altering recording power levels, the control section 24 receives reproduced RF signals for each test recording data from the RF signal processor 20, so as to measure β values reflecting the reproduced signal quality for each strategy (S104). A β value is calculated according to the following equation based on a peak level A1 and a bottom level A2 in a waveform generated when a reproduced RF signal is subjected to AC coupling (rendering a signal in which direct current components are blocked).

$$\beta = (|A1| - |A2|)/(|A1| + |A2|)$$

β monotonically increases with recording power level. Using the above equation, the control section calculates for each of the recording power levels A under the standard strategy Str and β under the low-power strategy.

Subsequently, the control section 24 calculates for each strategy the optimum recording power level which achieves the target value βo stored in the memory of the control section 24 (S105). The optimum recording power level can be calculated by plotting the β value for each of the recording power levels and determining a recording power level which achieves the target value βo (0.04, for example) through linear approximation or extrapolation. The optimum recording power level determined for the standard strategy Str is referred to as Ptr, while the optimum recording power level for the low-power strategy Stl is referred to as Ptl. Required power decreases proportionally as the recording pulse time width is increased, therefore, Ptr>Ptl.

Figure 4:
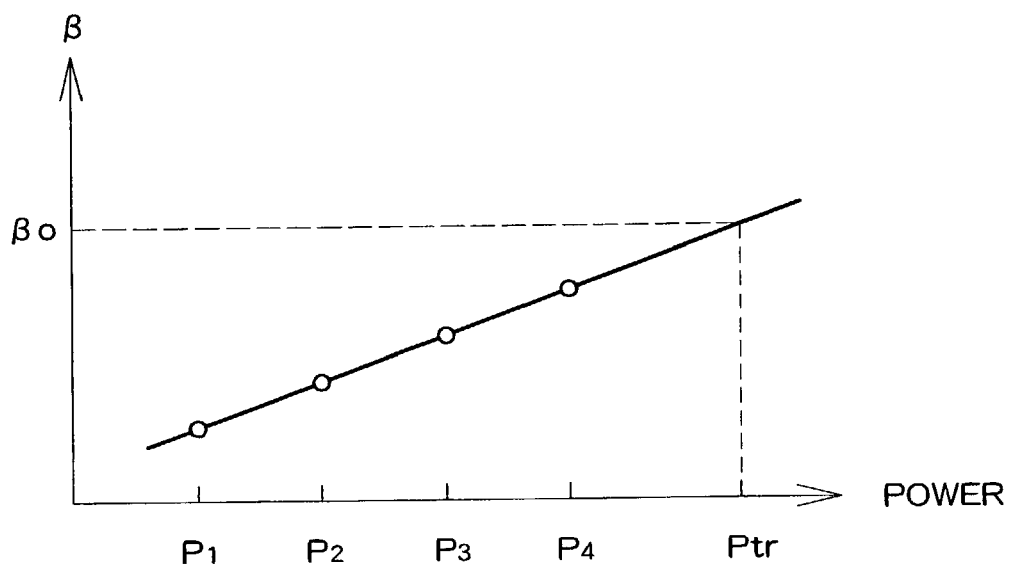
FIG. 4 is a graph illustrating a relationship between recording power level and β value.

FIG. 4 illustrates how the optimum recording power level Ptr for the standard strategy Str is calculated. In the figure, the horizontal axis represents recording power level under the standard strategy Str, and the vertical axis represents β value of reproduced RF signal. The graph shows determining the optimum recording power level Ptr achieving the target value βo through extrapolation.

After calculating the optimum recording power levels for each strategy, the control section 24 compares the maximum allowable power level Plim of the LD stored in advance in the memory of the control section 24 and the optimum recording power level Ptr for the standard strategy Str (S106). It is to be noted that, while the maximum allowable power level Plim may be equal to the maximum power level at which the LD can emit, a power level lower than the actual maximum power level by a predetermined amount may be designated as the maximum allowable power level Plim, taking into account a margin. When the optimum recording power level Ptr for the standard strategy Str is determined as not exceeding the maximum allowable power level Plim (YES in S106), it is judged that data can be recorded using the present strategy. The standard strategy Str is therefore maintained as the recording strategy, and Ptr is employed as the optimum recording power level to record data on a data area of the optical disk 10 (S107).

When the optimum recording power level Ptr exceeds the maximum allowable power level Plim in S106, data cannot be recorded under the present condition. The control section 24 therefore assigns the low-power strategy Stl set in S102 as the recording strategy, and employs Ptl calculated in S105 as the optimum recording power level. Under the new condition, data is recorded on the optical disk 10 (S108). Ptl is lower than Ptr, and Ptl can be made not to exceed Plim by appropriately setting the low-power strategy Stl. Accordingly, by employing Ptl to record data, high-quality data recording can be achieved without reducing recording speed.

Figure 5:
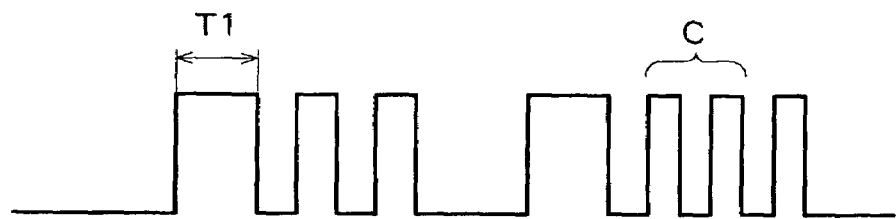
FIG. 5 is a diagram explaining another low-power strategy.

While the low-power recording strategy is created by increasing a pulse time width of the standard strategy in the present embodiment, other methods are also possible. For example, in a pulse array of FIG. 5, other than widening time width T1 of the leading pulse, number of pulses C in the pulse arraymaybe increased, or duty of the pulse array may be altered. Furthermore, both the pulse time width T1 and duty may be changed to obtain a low-power strategy.

Figure 6:
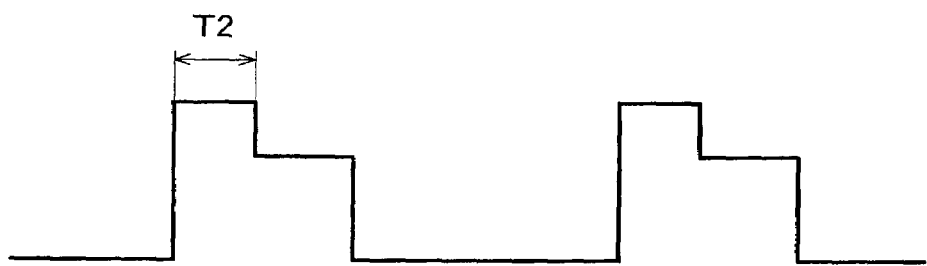
FIG. 6 is a diagram explaining still another low-power strategy.

To shape a pit into a desired form, a recording strategy which boosts recording power level in the forepart of a recording pulse may be used, as shown in FIG. 6. (The figure illustrates a case in which a single-pulse signal is used, such as in CD-R. A similar boost pulse can also be adopted in a multi-pulse signal.) When using such a strategy, it may be preferable to increase boost period T2 of a standard strategy to create a low-power strategy.

Figure 7:
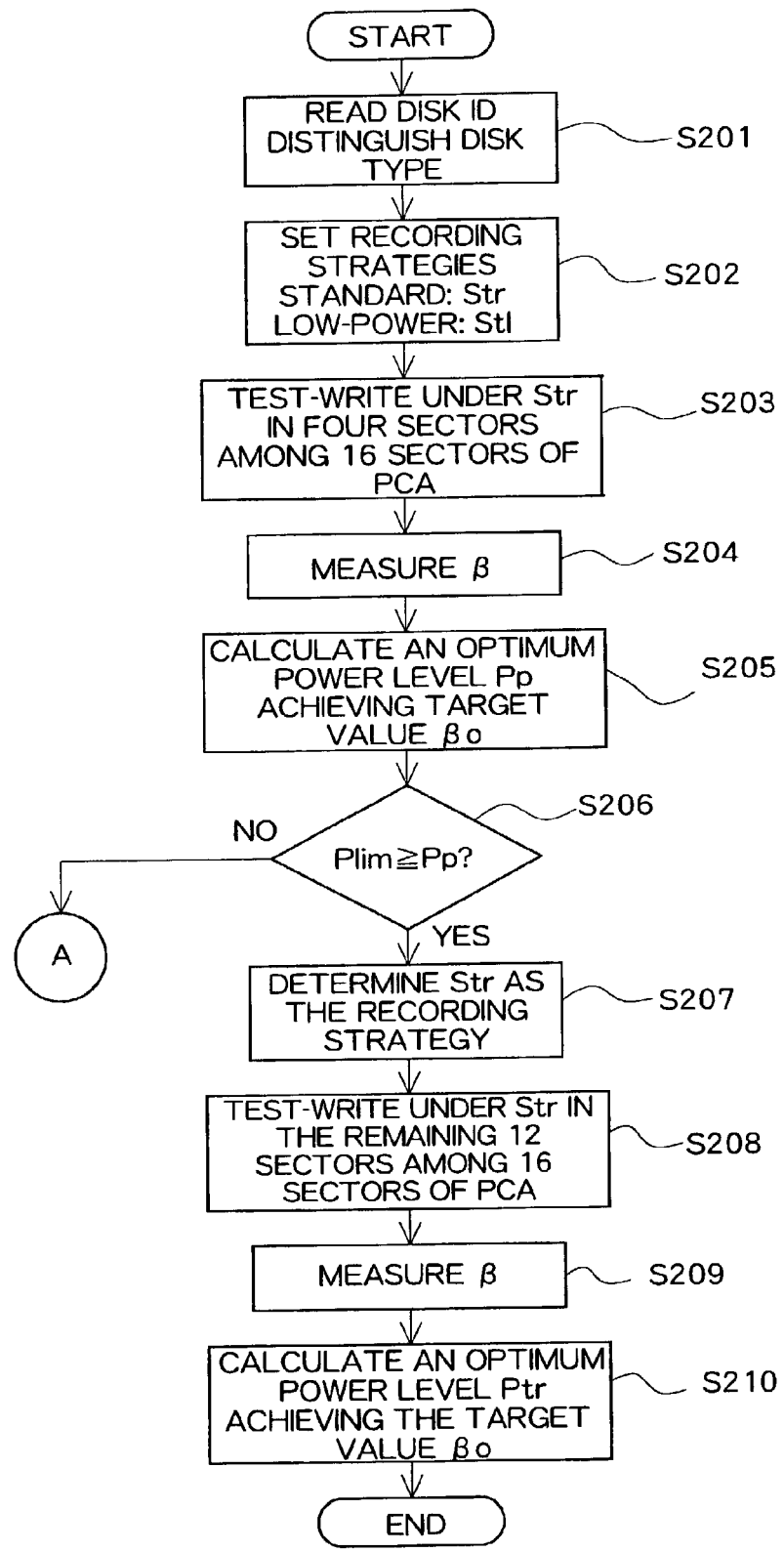
FIG. 7 is a flowchart (part 1) showing different processing.
Figure 8:
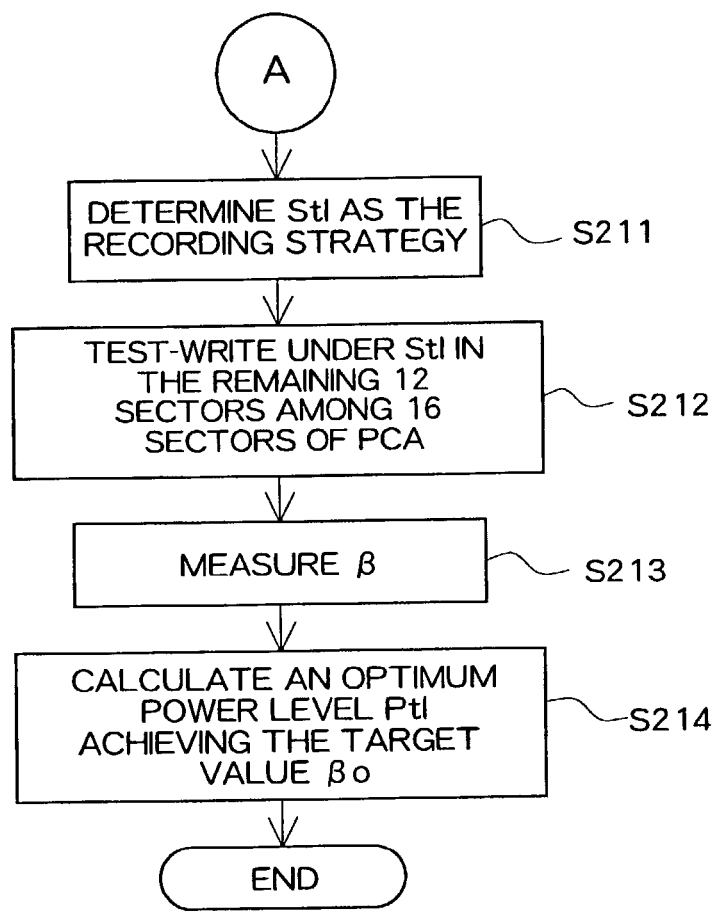
FIG. 8 is a flowchart (part 2) showing the different processing.

FIGS. 7 and 8 show flowcharts of different processing by the control section 24.

The control section 24 first reads the ID of the optical disk 10 to distinguish the type of the optical disk 10 (S201). After distinguishing the type of the optical disk 10, the control section 24 sets recording strategies (S202). A standard strategy Str and a low-power strategy Stl are set as the recording strategies.

After setting the two recording strategies, test recording is conducted according to the standard strategy Str using only four sectors among the 16 sectors of the PCA area (S203). The test recording is conducted in only four sectors among the 16 sectors because in this step, instead of searching for an actual optimum recording power level, a recording power level considered to be optimum is roughly determined, and it is judged whether or not this tentative optimum recording power level exceeds the maximum allowable power level. Accordingly, it is sufficient to use only the number of sectors necessary for roughly determining the optimum recording power level, which may be three sectors or five sectors. The number of sectors is discretionary. After the test recording according to the standard strategy Str is conducted using only four sectors (while varying the recording power level), β value for the standard strategy is measured in the obtained reproduced RF signal. Based on the relationship between recording power level and β value, the optimum recording power level Pp which achieves the predetermined target value βo is calculated (S205).

After calculating the tentative optimum recording power level Pp for the standard strategy, the control section 24 compares the maximum allowable power level Plim and the tentative optimum recording power level Pp (S206). When the tentative optimum recording power level Pp does not exceed the maximum allowable power level Plim, it is judged that the standard strategy Str is suitable for recording. Str is therefore determined as the recording strategy (S207). Subsequently, the remaining 12 sectors yet unused for test recording among the 16 sectors of the PCA area are employed to calculate the actual optimum recording power level. In other words, test recording is continued in the 12 sectors (S208). After calculating β values for the respective recording power levels (S209), the recording power level Ptr achieving the target value βo is determined (S210). In this case, test recording under the low-power strategy is not performed at all, simplifying the OPC processing.

When, on the other hand, the tentative optimum recording power level Pp exceeds the maximum allowable power level Plim, the low-power strategy Stl is assigned as the recording strategy as shown in FIG. 8 (S211). Subsequently, the remaining 12 sectors among the 16 sectors of the PCA area are employed to conduct test recording according to the low-power strategy Stl (S212). After β values for the respective recording power levels are calculated (S213), Ptl achieving the target value βo is determined (S214). This Ptl is then employed as the optimum recording power level to record data on the optical disk 10.

According to the embodiment described above, test recording is first conducted using only the standard strategy. Test recording using the low-power strategy Stl is performed only when an optimum recording power level (tentative optimum recording power level) based on the first test recording exceeds the maximum allowable power level. The processing is thereby simplified.

Figure 9:
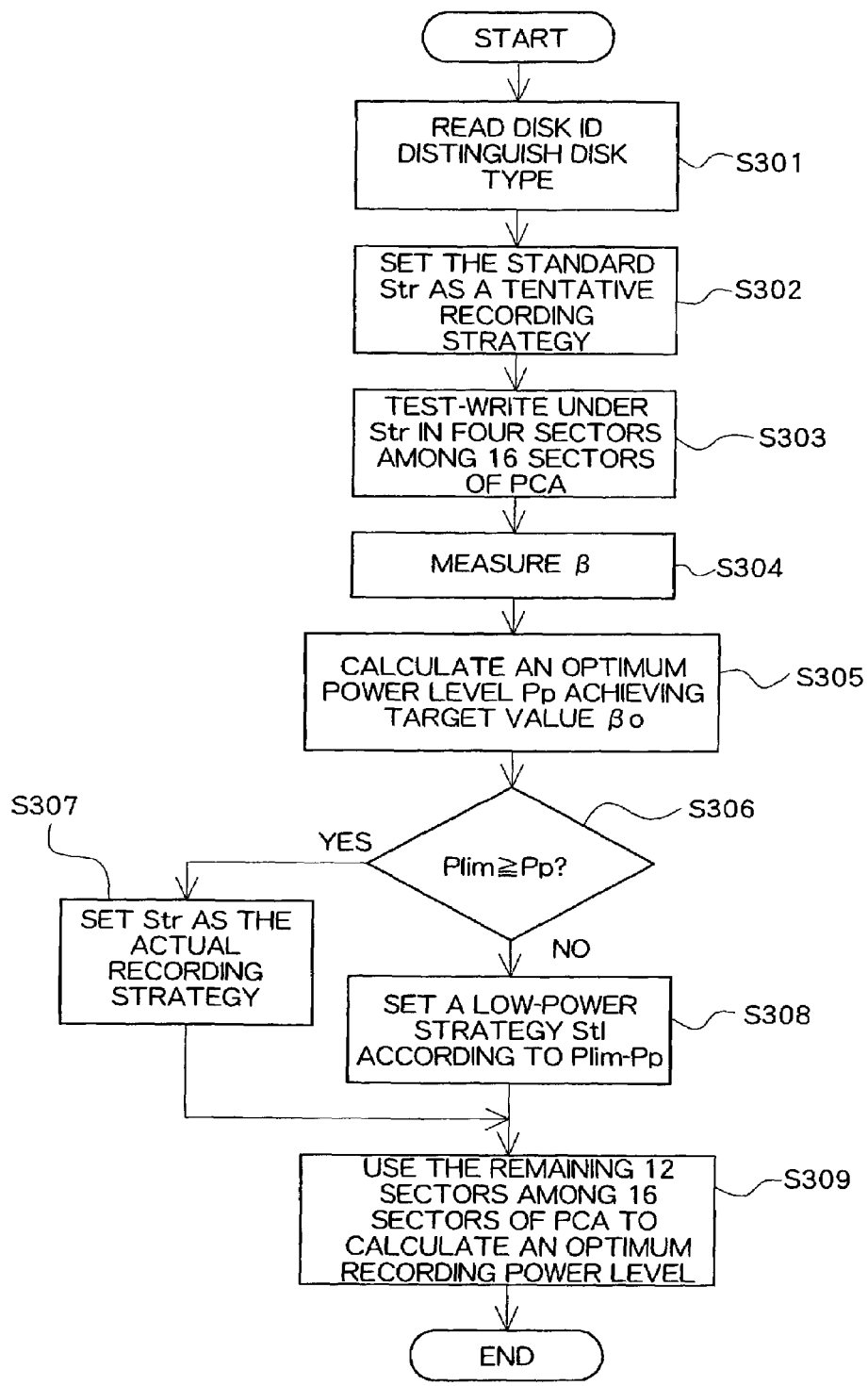
FIG. 9 is a flowchart showing another example of processing.

FIG. 9 is a flowchart showing still another example of processing by the control section 24.

Figure 10:
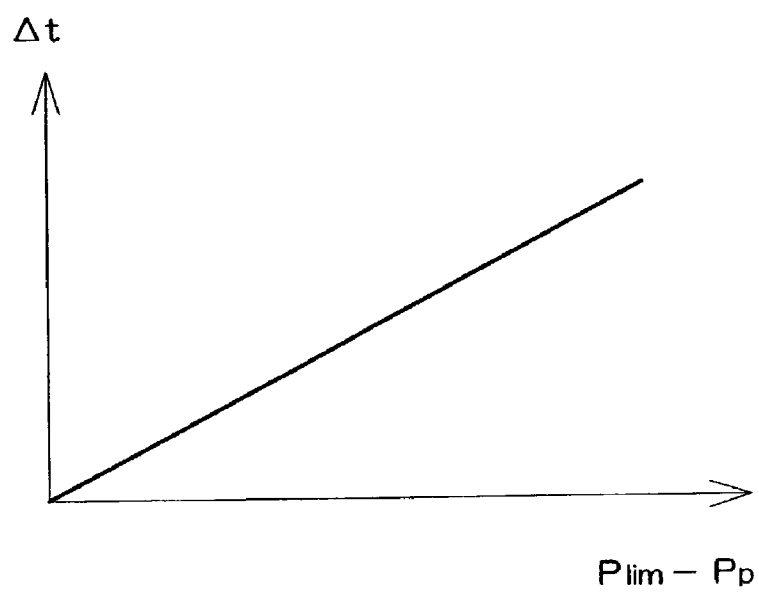
FIG. 10 is a graph illustrating a relationship between difference (Plim–Pp) and time width increase amount Δt.

As a low-power strategy, the control section 24 adaptively designates a strategy instead of using a fixed strategy. Specifically, a low-power strategy Stl is not prepared in advance based on the standard strategy Str. When the tentative optimum recording power level Pp obtained through the test recording under the standard strategy exceeds the maximum allowable power level Plim, a low-power strategy Stl is set according to the difference (Plim–Pp) between the maximum allowable power level Plim and the tentative optimum recording power level Pp (S308). Various methods are possible for setting the low-power strategy according to the difference (Plim–Pp). For example, as shown in FIG. 10, the recording pulse time width Δt in the standard strategy may be increased in proportion to the difference (Plim–Pp).

By increasing Δt to widen the recording pulse width as the difference (Plim–Pp) becomes larger, optimization can be achieved at a low power level. Instead of using the difference (Plim–Pp), it is also possible to increase the pulse time width according to the fraction Pp/Plim.

While one strategy Stl is set as the low-power strategy in the above embodiments, two or more strategies can be set as low-power strategies. Among the optimum recording power levels obtained for the respective low-power strategies, it maybe preferable to select a power level which, other than being no higher than the maximum allowable power level Plim, is the highest, or alternatively, has the largest margin. However, when more strategies are provided as low-power strategies, OPC processing becomes more complex. Two through five probably is the most appropriate number of low-power strategies.

While a strategy according to the disk ID read from the optical disk 10 is used as the standard strategy in the above embodiments, a standard strategy may be set by modifying, by a predetermined amount, a strategy determined according to the disk ID. Furthermore, when data is to be recorded in a land and a groove of an optical disk 10, a standard strategy and a low-power strategy can be discretely determined for each of land and groove. In such a case, different target values βo for calculating an optimum recording power level maybe used for land and groove, respectively.

While value β is employed as the value reflecting the reproduced signal quality in the above embodiments, other factors such as a jitter or an error rate may be used for evaluation.

Moreover, while the same value β is used as the target value for calculating the optimum recording power levels for both the standard strategy and the low-power strategy in the above embodiments, the target value β may be altered for different strategies.

While a DVD-R was used as an example in the above embodiments, the present invention can similarly be applied in a CD-R or a CD-RW. In such a case, a standard strategy may include pulses having lengths according to lengths 3T–11T of data to be recorded. A low-power recording strategy may accordingly be created by increasing each of the pulse time widths of the standard strategy.

Still further, while OPC is executed for a unit of sector in the above embodiments, OPC may also be performed by varying the recording power level for a unit of pre-pit.

The above-described examples are based on using OPC to optimize recording power level. In addition to OPC, a technique referred to as ROPC is also known for use in optimizing recording power level in all areas of the optical disk surface. Even when the recording power level is optimized through OPC, recording sensitivity may vary within the optical disk surface due to factors such as warping and variance in recording film characteristics in the optical disk surface. Accordingly, the optimum recording power level also varies within the optical disk surface. OPC merely determines the optimum recording power level for a given location. There is no guarantee that recording can be similarly executed in other locations of the optical disk. ROPC deals with such a problem due to characteristic variance within the optical disk surface. In ROPC, intensity of returned light from the optical disk is sampled when recording is conducted using a given recording power level. Subsequently, the recording power level is adjusted such that the returned light intensity matches a target value. In general, the returned light intensity is evaluated using a light intensity level referred to as level B. Level B indicates the intensity of light returned after a pit is formed in the optical disk, the light being interfered with by the formed pit. More specifically, a pit is gradually formed when recording power is applied to the optical disk. In the beginning of pit formation, the pit is not yet completed. Accordingly, the returned light is not interfered with much by the pit, and the returned light intensity level is high. In contrast, at the end of pit formation, the returned light is interfered with by the pit such that the returned light intensity level becomes low. Midway through the process of pit formation, an intermediate returned light intensity is indicated.

Figure 11:
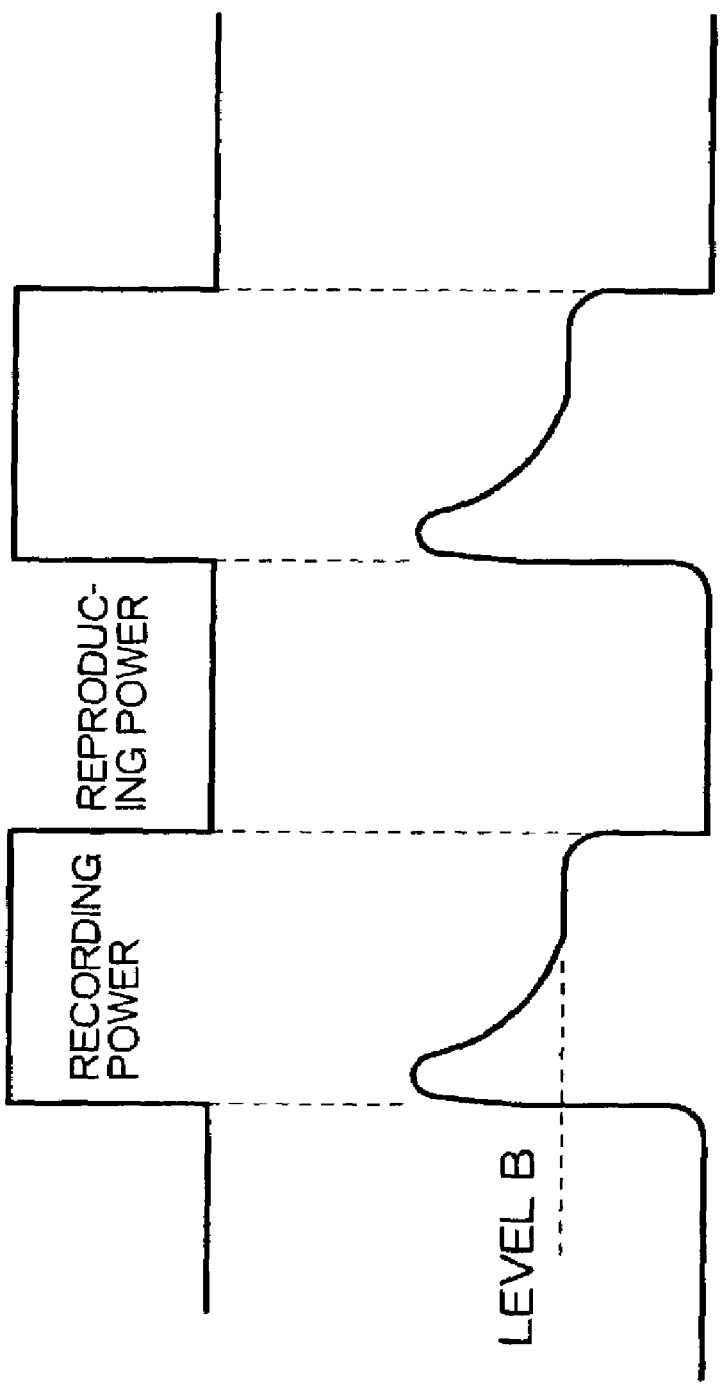
FIG. 11A is a timing chart of a recording pulse waveform.
FIG. 11B is a timing chart of a returned light intensity waveform.

FIGS. 11A and 11B illustrate a recording pulse and a returned light intensity signal, respectively. Level B is the value obtained when the returned light intensity signal level becomes substantially unchanging towards the end of the recording power application period in which a laser beam is irradiated at a recording power level.

By employing ROPC together with OPC, recording power level can be optimized throughout the optical disk surface. However, when characteristic variance within the optical disk surface is great, the recording power level required by ROPC for matching the returned light intensity to the target value may exceed the maximum allowable power level in a given area of the optical disk. Even in such a case, it is possible to allow ROPC to effectively function through adjustment of strategies. An example of ROPC processing is described below.

ROPC is executed by the control section 24 of FIG. 1. The control section 24 drives the LDdriver 16 to execute OPC, determines the returned light intensity for a recording power level based on an RF signal from the RF signal processor, and controls the returned light intensity so as to equal a target value, thereby executing ROPC. Specifically, the value of level B is sampled in the returned light intensity. In order to match this level B value to the target value stored in advance in a memory of the control section 24 or written in advance in a predetermined area in the optical disk to be stored in a memory, the recording power level optimized through OPC is further adjusted in an increasing or decreasing direction. Quantitatively speaking, when the level B of the returned light intensity exceeds the target value, it is determined that the pit is not sufficiently formed due to lack of recording power. The recording power level is therefore increased. When the level B of the returned light intensity is lower than the target value, it is determined that the pit is "overburnt" due to excessive recording power, and the recording power level is reduced. When increasing the recording power level, there is no problem if the optimum recording power level determined through OPC leaves a sufficient margin with respect to the maximum allowable power level of the LD. However, when the optimum recording power level is very close to the maximum allowable power level, or when recording sensitivity variance is great in the optical recording disk 10, the recording power level required for matching the level B of the returned light intensity to the target value may exceed the maximum allowable power level. In such a case, the control section 24 changes the recording strategy to reduce the required recording power so as to maintain high-quality data recording.

Figure 12:
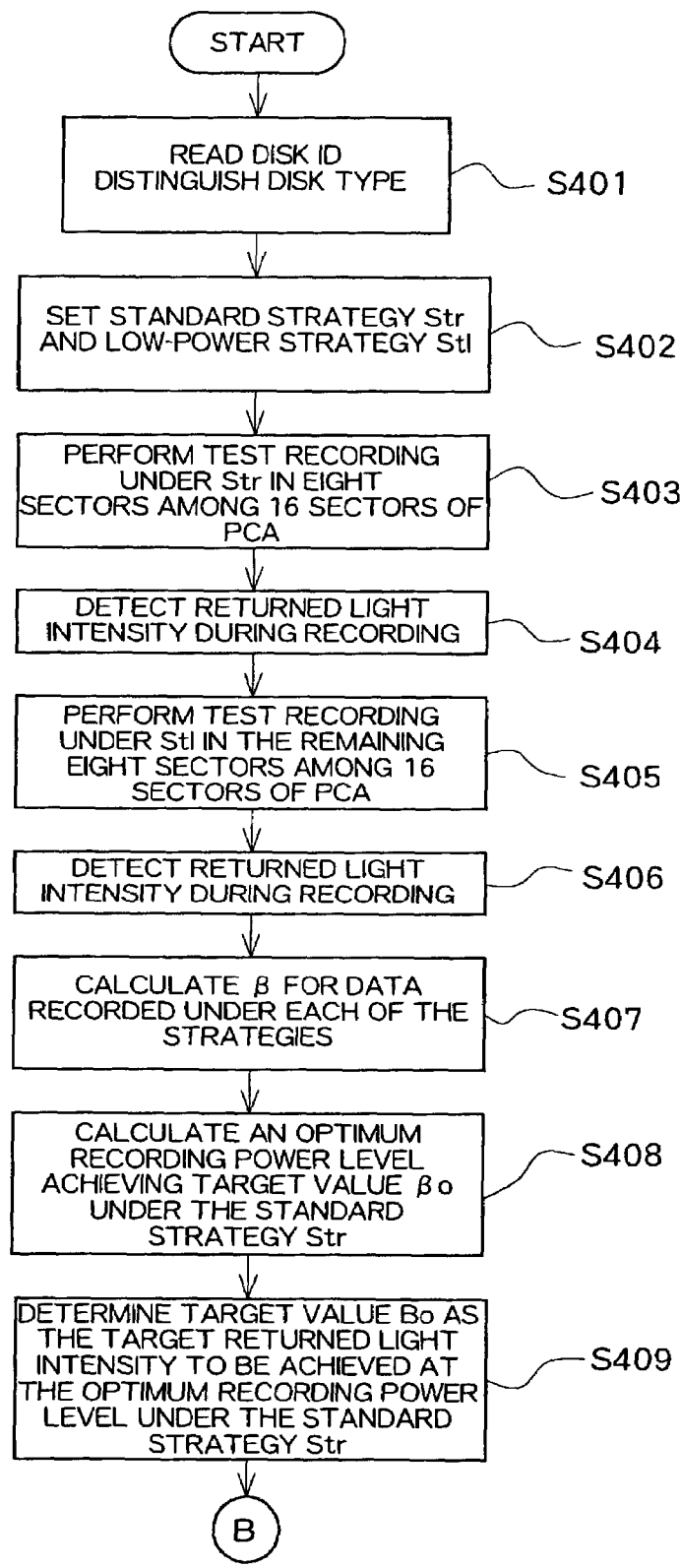
FIG. 12 is a flowchart (part 1) for a further different embodiment.
Figure 13:
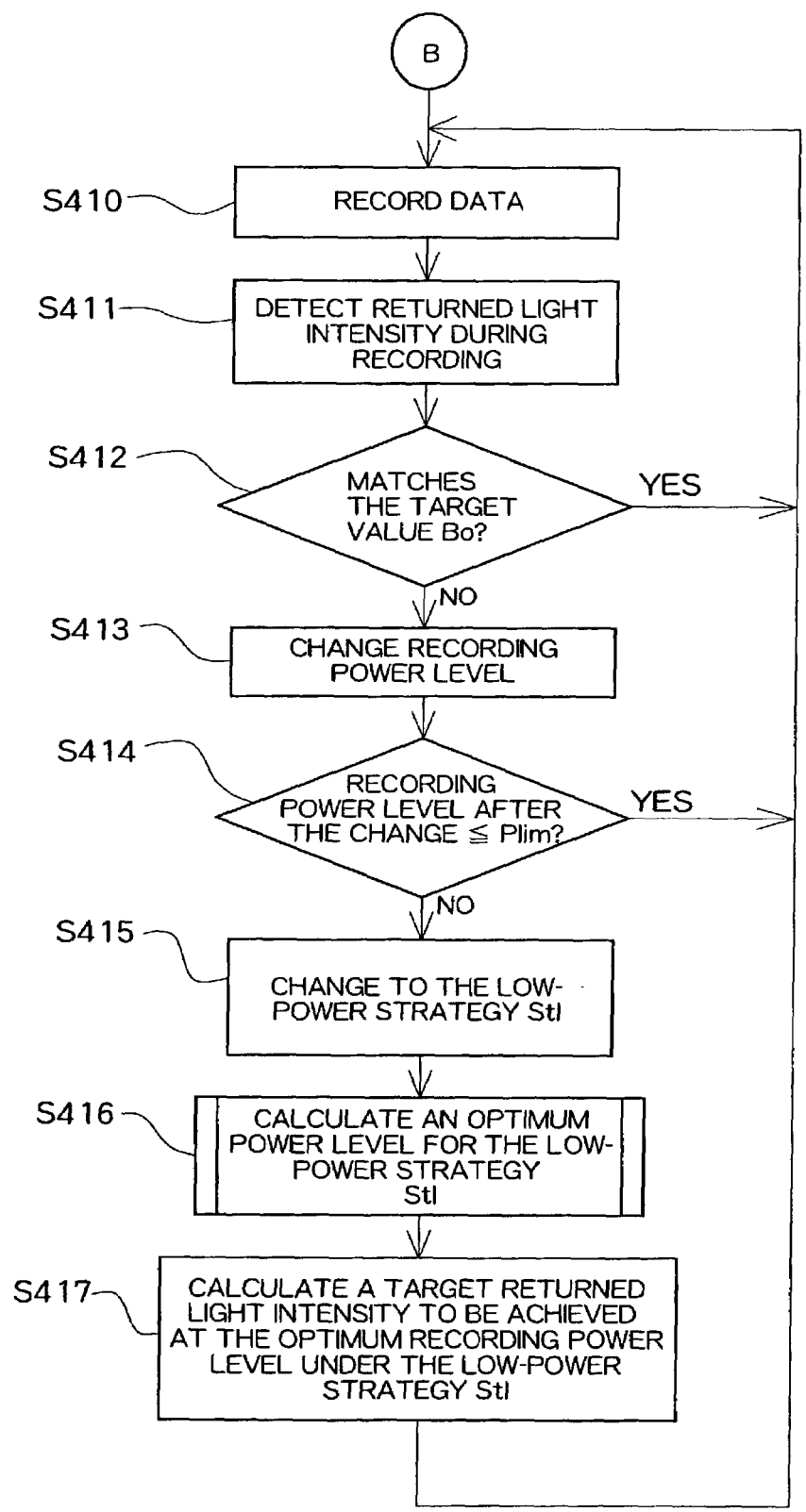
FIG. 13 is a flowchart (part 2) for the further different embodiment.

FIGS. 12 and 13 are processing flowcharts for the control section 24. FIG. 12 shows the OPC processing, while FIG. 13 shows the ROPC processing.

In FIG. 12, the control section 24 reads an ID written in advance in a predetermined area in the optical disk 10 to distinguish the type of the optical disk 10 (S401). Types of the optical disk 10 include the different sorts such as CD-R, RW, and DVD-R, and the manufacturer of the optical disk. When recording conditions such as a target value for reproduced signal quality, or the target value β, are written in the optical disk 10, these conditions are also read out. The read-out data are stored in a memory of the control section 24.

Subsequently, the control section 24 sets a standard strategy Str and a low-power strategy Stl (S402). The standard strategy Str is determined based on the disk type distinguished in S401. The low-power strategy Stl is determined based on the standard strategy Str by, for example, increasing the pulse time widths of the standard strategy Str by a predetermined amount or a predetermined ratio. Specifically, in a case of DVD-R, when a pulse time width of the standard strategy is 1.5T with respect to a 3T signal, the pulse time width may be increased to 1.6T. When a multi-pulse signal is used with respect to a signal longer than a 4T signal, it may be preferable to increase the time widths of only the respective leading pulses. By increasing the time width of a recording pulse, energy irradiated on the optical disk 10 becomes greater, thereby requiring less recording power. A low-power strategy Stl is a recording strategy which requires less recording power in this manner compared to a standard strategy Str.

After setting the standard strategy Str and the low-power strategy Stl, the control section 24 executes OPC. Specifically, test recording of data is conducted under the standard strategy Str, while varying the recording power level, in eight sectors among the 16 sectors of the PCA area of the optical disk 10 (S403). During this test recording, returned light intensity is detected for use as the basic data for calculating a target value of returned light intensity in ROPC (S404). The returned light intensity is detected by sampling the level B value. The sampling of level B is performed for each recording power level.

After completing the test recording under the standard strategy Str, test recording is next conducted according to the low-power strategy Stl in the remaining eight sectors of the 16 sectors of the PCA area (S405). Similarly as in the test recording under the standard strategy Str, returned light intensity is detected during recording for each recording power level (S406). The returned light intensity values obtained for the discrete recording power levels under the respective strategies detected in S404 and S406 are stored in the memory of the control section 24. More specifically, stored in the memory of the control section 24 are the relationship between recording power level and returned light intensity (level B value of returned light intensity) under the standard strategy Str, and the relationship between recording power level and returned light intensity (level B value of returned light intensity) under the low-power strategy Stl.

After completion of the test recording for both the standard strategy Str and the low-power strategy Stl, the test data recorded using the respective recording strategies are reproduced. Based on the reproduced RF signals, $\beta$ is calculated as a value reflecting the reproduced signal quality (S407).

The $\beta$ values calculated for the respective recording power levels are stored in the memory of the control section 24. Accordingly, also stored in the memory of the control section 24 are the relationship between recording power level and $\beta$ value under the standard strategy Str, and the relationship between recording power level and $\beta$ value under the low-power strategy.

Next, based on the relationship between recording power level and $\beta$ value under the standard strategy Str stored in the memory, the control section 24 calculates the recording power level which achieves the target value $\beta o$ by linear approximation or extrapolation (S408). The calculated recording power level is the optimum recording power level determined by OPC. Further, based on the relationship between recording power level and returned light intensity under the standard strategy Str stored in the memory, the control section 24 calculates the returned light intensity (the level B value of the returned light intensity) corresponding to the determined optimum recording power level. The calculated returned light intensity is set as the target value Bo in ROPC (S409).

In the above-described manner, the optimum recording power level Po and the target value Bo of returned light intensity are calculated for the standard strategy Str.

FIG. 13 illustrates the processing for executing data recording according to ROPC based on the determined optimum recording power level Po and the target value Bo of returned light intensity. First, the control section 24 uses the determined standard strategy Str to drive the LD at the optimum recording power level, thereby recording data in the optical disk 10 (S410). The control section 24 detects the returned light intensity during recording (S411) and judges whether the detected returned light intensity (namely, the level B value of the returned light intensity) matches with the determined target value Bo (S412). When a match with the target value Bo is detected, indicating that data is being recorded at an optimum condition, data recording is, continued by returning to S410.

On the other hand, when the detected returned light intensity does not match the target value Bo, the recording power level is changed (S413). Specifically, when the returned light intensity exceeds the target value Bo, it is judged that the pit is not sufficiently formed due to lack of recording power, and the recording power level is increased. When the returned light intensity is lower than the target value Bo, it is judged that excessive recording power is used, and the recording power level is reduced. The amount of change made in the recording power level maybe a predetermined amount, or alternatively, an amount according to the detected difference from the target value.

After changing the recording power level, it is determined whether or not the changed recording power level is no higher than the predetermined maximum allowable power level Plim (S414). It is to be noted that the maximum allowable power level Plim may be a physical threshold value of the LD, or alternatively, an allowable value taking into account a margin. The maximum allowable power level Plim can be stored in advance in the memory of the control section 24. When the changed recording power level does not exceed the maximum allowable power level Plim, recording can be performed at this recording power level. The processing therefore returns to S410 to record data at the changed recording power level.

On the other hand, when the changed recording power level exceeds the maximum allowable power level Plim, the changed recording power level cannot be used under the present condition. Consequently, the control section 24 changes the recording strategy from the present standard strategy Str to the low-power strategy Stl set in S402 (S415). The control section 24 calculates the optimum recording power level for the low-power strategy Stl (S416), and subsequently determines the target value of returned light intensity corresponding to the calculated optimum recording power level for the low-power strategy Stl (S417). The processing performed in S416 and S417 is described later in further detail. After calculating the optimum recording power level and the target value of returned light intensity for the low-power strategy Stl, data recording is executed under the low-power strategy Stl, returning to S410.

Figure 14:
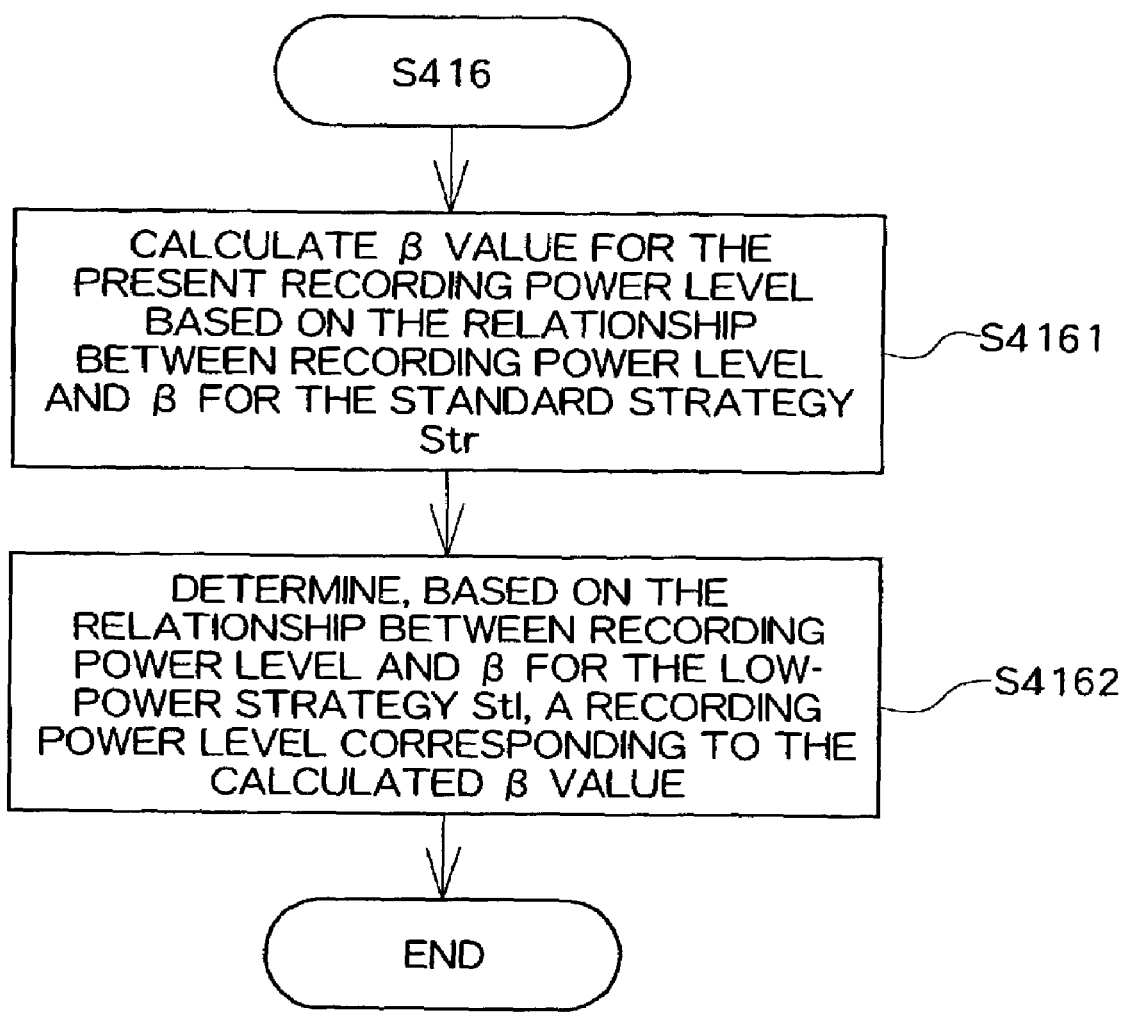
FIG. 14 is a detailed flowchart illustrating S416 in FIG. 13.

FIG. 14 is a detailed flowchart showing the processing of S416 in FIG. 13 for calculating the optimum recording power level for the low-power strategy Stl.

Based on the relationship between recording power level and $\beta$ value under the standard strategy Str stored in the memory, the control section 24 first calculates the $\beta$ value corresponding to the present recording laser power level, namely, the recording power level optimized through OPC under the standard strategy Str (the recording power level used before changing in S413) (S4161). After calculating the $\beta$ value for the present recording power level, the control section 24 determines a recording power level under the low-power strategy Stl which achieves the $\beta$ value calculated in S4161, based on the relationship between recording power level and $\beta$ value under the low-power strategy Stl stored in the memory.

Figure 15:
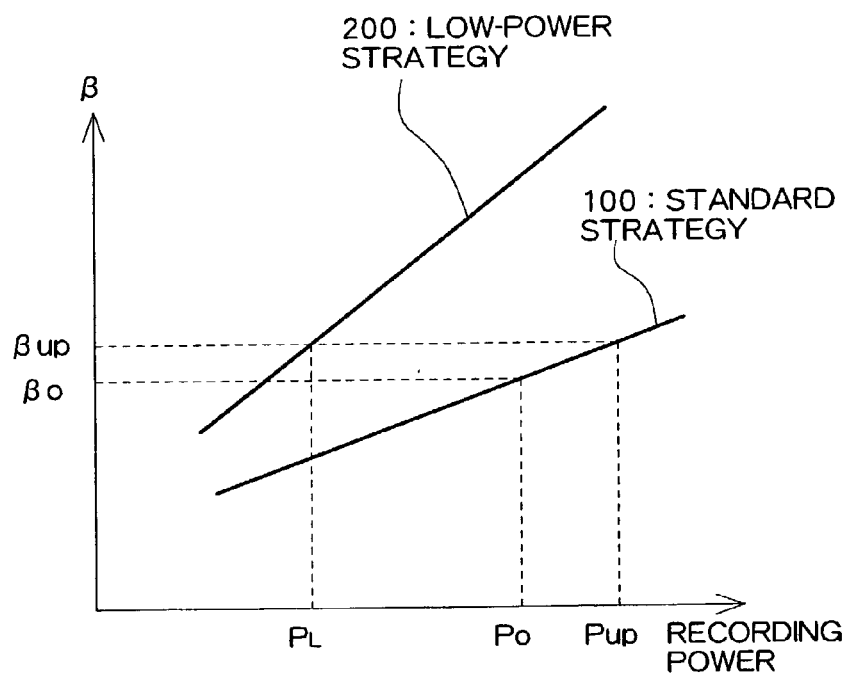
FIG. 15 is a graph illustrating a relationship between recording power level and β when strategy is a parameter. This graph is a diagram explaining the processing of S416 in FIG. 13.

FIG. 15 diagrammatically shows the processing for the recording power level calculation described above. In the figure, the horizontal axis represents recording power level, while the vertical axis represents $\beta$ value. The graph illustrates the relationship 100 between recording power level and $\beta$ value under the standard strategy Str, and the relationship 200 between recording power level and $\beta$ value under the low-power strategy Stl. Based on the relationship 100 between recording power level and $\beta$ value under the standard strategy Str, $\beta up$, which is the $\beta$ value corresponding to the present recording power level Pup, is calculated (Pup, because the power level is now increased by ROPC from the optimum recording power level Po). This βup generally does not match βo. Subsequently, based on the relationship 200 between recording power level and β value under the low-power strategy Stl, a recording power level PL which achieves βup is calculated. The calculated PL is a recording power level which attains reproduced signal quality equivalent to the reproduced signal quality βup obtained at the optimum recording condition under the standard strategy Str. Using PL, the recording strategy can be changed from the standard strategy Str to the low-power strategy Stl without degrading reproduced signal quality.

Figure 16:
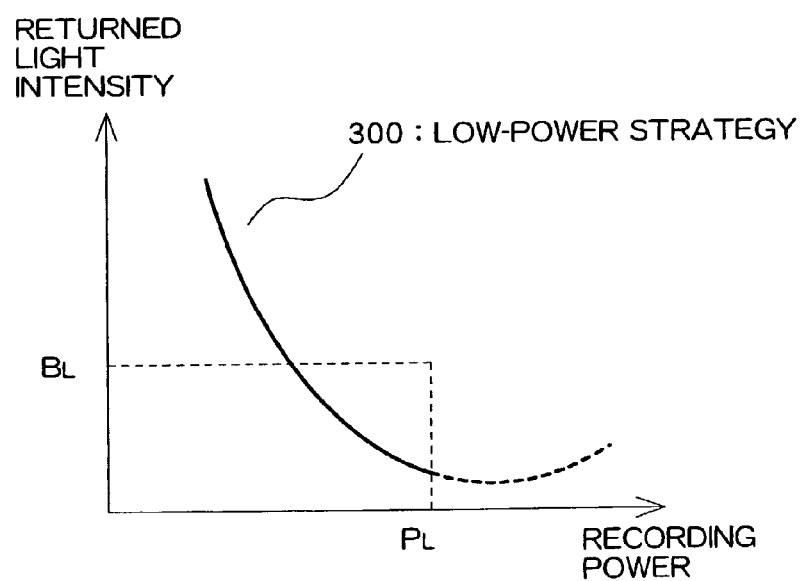
FIG. 16 is a diagram explaining S417 in FIG. 13.

FIG. 16 diagrammatically shows the processing of S417 in FIG. 13, namely, the processing for calculating the target value of returned light intensity used to execute ROPC at the optimum recording power level under the low-power strategy Stl. In FIG. 16, the horizontal axis represents recording power level, while the vertical axis represents returned light intensity (level B value). The graph illustrates the relationship 300 between recording power level and returned light intensity under the low-power strategy Stl, which is stored in the memory of the control section 24. As the recording power level is increased from a very low level, a pit begins to form. This results in a decrease in returned light intensity, in due course reaching a very low intensity level. When the recording power level is still further increased, no larger pit is formed. Returned light intensity therefore increases (as indicated by a broken line in the figure) as the recording power level becomes higher. The returned light intensity BL corresponding to the optimum recording power level PL under the low-power strategy Stl can be readily determined. By using BL as the target value, ROPC can be executed under the low-power strategy Stl.

In this manner, along with changing the recording strategy to the low-power strategy Stl, a recording power level and a target value of returned light intensity are newly set so as to maintain the recording condition achieved before the change. Accordingly, data recording quality can be kept high.

In the above example, when changing the recording strategy from the standard strategy Str to the low-power strategy Stl, recording power level was determined and switched to the optimum recording power level which achieves the same β value under the low-power strategy Stl as achieved under the standard strategy Str. However, based on the concept that the target value for reproduced signal quality differs in a different recording strategy, it is also possible to separately determine the optimum recording power level and the target value of returned light intensity for the low-power strategy Stl.

Figure 17:
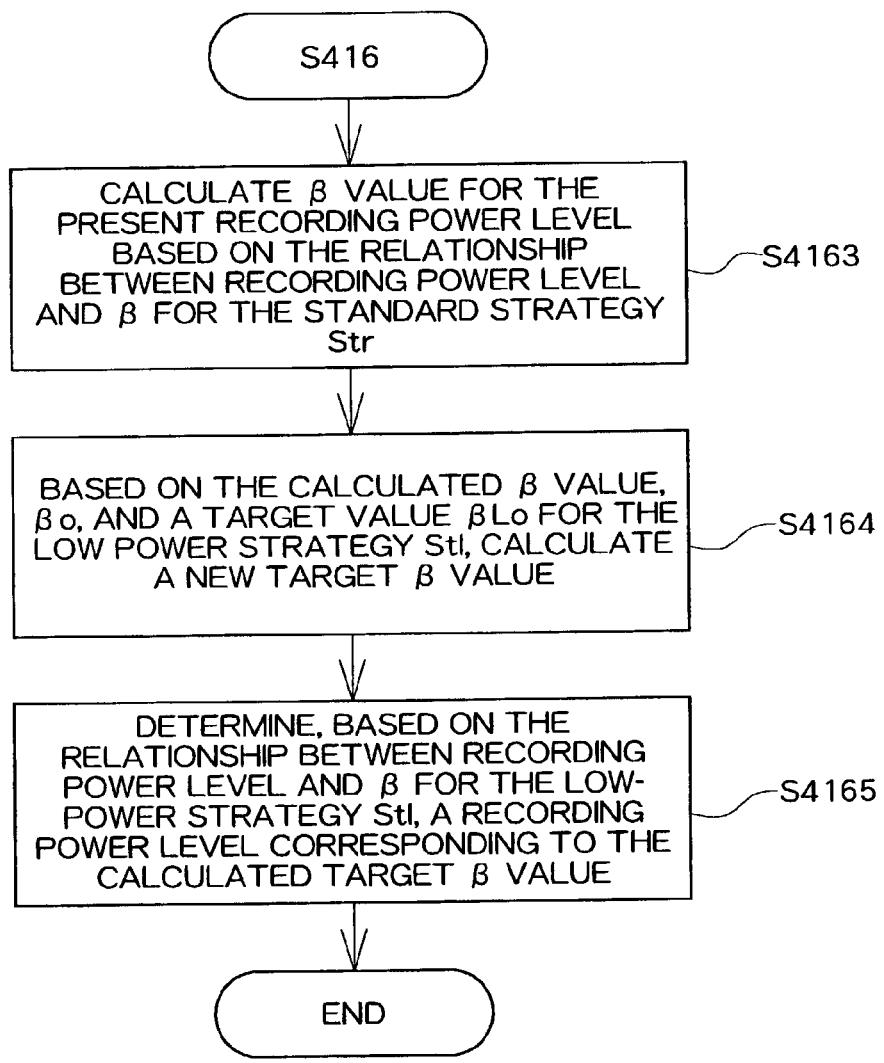
FIG. 17 is another detailed flowchart illustrating S416 in FIG. 13.

FIG. 17 is a detailed flowchart showing another example of processing of S416, namely, the processing for calculating the optimum recording power level for the low-power strategy Stl. Based on the relationship between recording power level and β under the standard strategy Str, the control section 24 first calculates the β value corresponding to the present recording power level (S4163). This processing is the same as the processing of S4161.

Subsequently, based on the calculated β value, the target value βo under the standard strategy Str, and a target value β Lo for the low-power strategy Stl, a new target β value to be attained using the low-power strategy Stl is calculated (S4164). Specifically, a difference between the β value at the present recording power level and βo is determined, and the difference is added to the target value βLo for the low-power strategy Stl to calculate the new target β value. After determining the target β value in S4164, a recording laser power level corresponding to the target β value is calculated based on the relationship between recording power level and β under the low-power strategy Stl (S4165).

Figure 18:
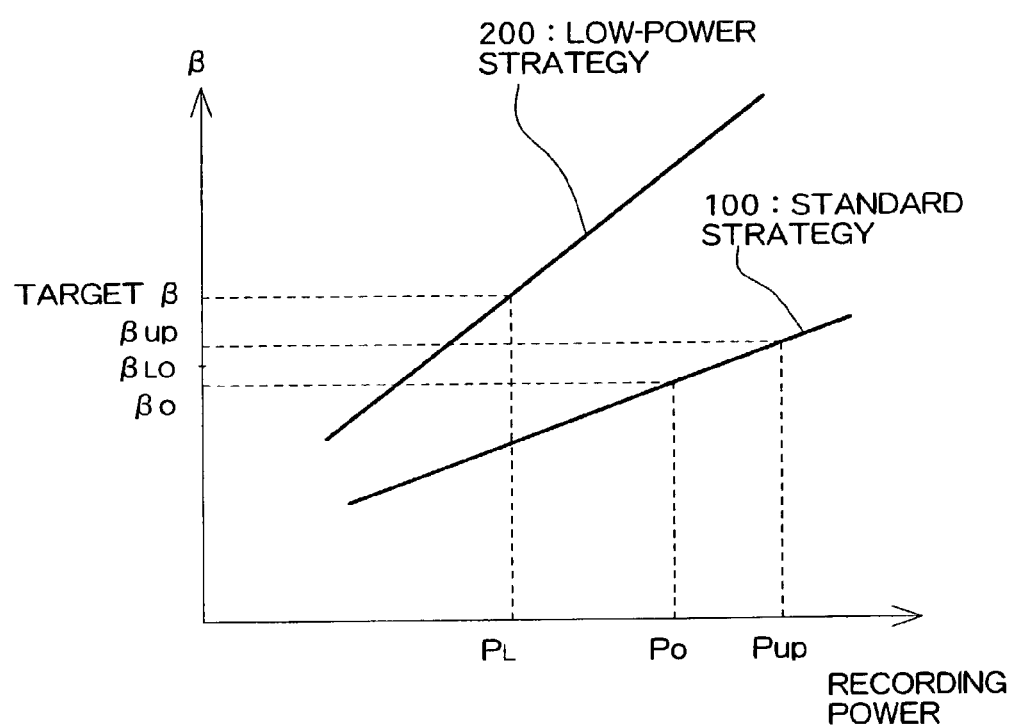
FIG. 18 is a diagram explaining another example of processing of S416 in FIG. 13.

FIG. 18 diagrammatically shows the above-described processing for calculating the recording power level. FIG. 18 is similar to FIG. 15, showing the relationship 100 under the standard strategy and the relationship 200 under the low-power strategy, with recording power given on the horizontal axis and β value given on the vertical axis. βup, or the value β corresponding to the present recording power level Pup, is calculated based on the relationship 100 under the standard strategy Str. A difference between the calculated βup and the target value βo for the present recording strategy, or (βup−βo), is then determined. This difference is the variance in reproduced signal quality resulting from performing ROPC under the standard strategy Str. Assuming that the target value for the low-power strategy Stl is βLo, in order to attain under the low-power strategy Stl a recording condition equivalent to that before changing from the standard strategy Str, the variance generated under the standard strategy Str must be reflected in the target value for reproduced signal quality. Accordingly, the variance is added to the target value βLo for the low-power strategy Stl to determine the new target value as follows:

target β value=$\beta Lo+(\beta up-\beta o)$

The recording laser power level PL which achieves this target β value is determined as the optimum recording power for the low-power strategy. As the target β value, the following may also be used:

target β value=$\beta Lo \cdot \beta up / \beta o$

After determining the optimum recording power for the low-power strategy Stl, the target returned light intensity for ROPC can be determined. Specifically, The returned light intensity value corresponding to the recording power level PL determined in S4165 is calculated, and this value is used as the target value for ROPC.

In the above embodiment, a new recording power level is determined such that the β value achieved at a recording power level before changing the recording strategy can be attained after changing the recording strategy. Alternatively, a new recording power level may also be determined such that the returned light intensity obtained at the present recording power level under the standard strategy can be obtained under the low-power strategy. Specifically, the memory of the control section 24 stores the relationship between recording power and returned light intensity under the standard strategy Str (a first relationship) and the relationship between recording power and returned light intensity under the low-power strategy Stl (a second relationship). Based on the first relationship, returned light intensity P corresponding to the present recording power level is calculated. Subsequently, based on the second relationship, a recording power level which makes it possible to obtain the returned light intensity P under the low-power strategy Stl is calculated. The calculated recording power level is used as the optimum recording power level for the low-power strategy Stl. In this case, the returned light intensity P corresponding to the optimum recording power level may be used as the target value for ROPC.

In the present embodiment, the low-power strategy Stl is set based on the standard strategy Str. When setting the low-power strategy Stl, it is possible to simultaneously set conversion coefficients for the recording power level and the target value of returned light intensity. For example, a conversion coefficient for the recording power level may be α (α<1), and a conversion coefficient for the target value may be γ. In S416, a recording power level for the low-power strategy may be calculated by multiplying the coefficient α to the present recording power level (the recording power level for the standard strategy). In S417, the target value for performing ROPC under the low-power strategy may be calculated by multiplying the coefficient γ to the present target value.

In the present embodiment, the recording strategy is changed from a standard strategy Str to a low-power strategy Stl. It is also possible to set a plurality of low-power strategies. For example, the recording strategy may first be changed from the standard strategy Str to a first low-power strategy. When the recording power level required to achieve a target value under the first low-power strategy exceeds the maximum allowable power level, the recording strategy can be changed to a second low-power strategy to perform data recording.

In the present embodiment, a low-power strategy Stl is provided by increasing the pulse time width of the standard strategy Str. When aboost pulse, in which a forepart of a pulse has increased pulse amplitude, is used in the standard strategy, the pulse time width of such a boost pulse may be increased to obtain a low-power strategy Stl. Moreover, when a plurality of pulses such as a front pulse, an end pulse, and multiple pulses in between are used as in a case of DVD, other than increasing the pulse width of the front pulse, duty of the multiple pulses may be varied to set the low-power strategy Stl.

Further, while β value is used as a value reflecting the reproduced signal quality in the present embodiment, a jitter or an error rate may also be employed.

What is claimed is:

1. A data-recordable optical disk device, comprising:
test data recording means for recording test data in a predetermined area of an optical disk while varying recording power level;
test data reproducing means for reproducing said test data,
recording power level setting means for setting an optimum recording power level based on reproduced signal quality of said test data;
data recording means for recording data based on said optimum recording power level; and
strategy setting means for setting a recording strategy for said test data and said data; wherein
when said optimum recording power level determined based on recording of said test data using a first recording strategy does not exceed an allowable recording power level, said strategy setting means sets said first recording strategy as a recording strategy for said data, and, when said optimum recording power level exceeds said allowable recording power level, said strategy setting means sets a second recording strategy as a recording strategy for said test data and said data, said second recording strategy having an optimum recording power level no higher than said allowable recording power level, and said second recording strategy requiring less recording power compared to said first recording strategy.

2. A data-recordable optical disk device defined in claim 1, wherein
said second recording strategy has an increased recording pulse time width compared to that of said first recording strategy.

3. A data-recordable optical disk device defined in claim 1, wherein
said strategy setting means sets said second recording strategy by increasing a recording pulse time width of said first recording strategy according to a difference between said optimum recording power level for said first recording strategy and the allowable power level.

4. A data-recordable optical disk device, comprising:
means for recording test data on an optical disk while varying a recording power level, using a standard strategy which is determined based on a disk ID of said optical disk, and a low-power strategy requiring a less recording power compared to said standard strategy;
means for reproducing the test data recorded using said standard strategy and said low-power strategy;
means for selecting a first optimum recording power level based on reproduced signal quality of said test data recorded using said standard strategy;
means for selecting a second optimum recording power level based on reproduced signal quality of said test data recorded using said low-power strategy;
means for comparing said first optimum recording power level with an allowable power level; and
means for recording data which records data using said first optimum recording power level when said first optimum recording power level does not exceed said allowable power level, and records data using said second optimum recording power level when said first optimum recording power level exceeds said allowable power level;
wherein said low-power strategy is a strategy obtained by increasing time width of at least one pulse of said standard strategy.

5. A data-recordable optical disk device, comprising:
means for recording test data on an optical disk while varying a recording power level, using a standard strategy which is determined based on a disk ID of said optical disk, and a low-power strategy requiring a less recording power compared to said standard strategy;
means for reproducing the test data recorded using said standard strategy and said low-power strategy;
means for selecting a first optimum recording power level based on reproduced signal quality of said test data recorded using said standard strategy;
means for selecting a second optimum recording power level based on reproduced signal quality of said test data recorded using said low-power strategy;
means for comparing said first optimum recording power level with an allowable power level; and
means for recording data which records data using said first optimum recording power level when said first optimum recording power level does not exceed said allowable power level, and records data using said second optimum recording power level when said first optimum recording power level exceeds said allowable power level;
wherein said low-power strategy is a strategy obtained by increasing number of pulses of said standard strategy.

6. A data-recordable optical disk device, comprising:
means for recording test data on an optical disk while varying a recording power level, using a standard strategy which is determined based on a disk ID of said optical disk, and a low-power strategy reciuiring a less recording power compared to said standard strategy;
means for reproducing the test data recorded using said standard strategy and said low-power strategy;

means for selecting a first optimum recording power level based on reproduced signal quality of said test data recorded using said standard strategy;

means for selecting a second optimum recording power level based on reproduced signal quality of said test data recorded using said low-power strategy;

means for comparing said first optimum recording power level with an allowable power level; and means for recording data which records data using said first optimum recording power level when said first optimum recording power level does not exceed said allowable power level, and records data using said second optimum recording power level when said first optimum recording power level exceeds said allowable power level;

wherein said low-power strategy is a strategy obtained by increasing a boost period of said standard strategy.

7. A data-recordable optical disk device, comprising:

means for setting a strategy;

means for recording test data on an optical disk using a standard strategy, wherein the standard strategy is determined based on a disk ID of said optical disk;

means for reproducing said test data;

means for setting a tentative optimum recording power level based on reproduced signal quality of said test data;

means for comparing said tentative optimum recording power level with an allowable power level; and means for setting recording power level which sets said tentative optimum recording power level as an authentic optimum recording power level when said tentative optimum recording power level does not exceed said allowable power level, and, when said tentative optimum recording power level exceeds said allowable power level, performs re-recording of said test data and resetting of optimum recording power level by setting a low-power strategy requiring less recording power compared to said standard strategy until said tentative optimum recording power level becomes no higher than said allowable power level;

wherein said low-power strategy is a strategy obtained by increasing time width of at least one pulse of said standard strategy.

8. A data-recordable optical disk device, comprising:

means for setting a strategy;

means for recording test data on an optical disk using a standard strategy, wherein the standard strategy is determined based on a disk ID of said optical disk;

means for reproducing said test data;

means for setting a tentative optimum recording power level based on reproduced signal quality of said test data;

means for comparing said tentative optimum recording power level with an allowable power level; and means for setting recording power level which sets said tentative optimum recording power level as an authentic optimum recording power level when said tentative optimum recording power level does not exceed said allowable power level, and, when said tentative optimum recording power level exceeds said allowable power level, performs re-recording of said test data and resetting of optimum recording power level by setting a low-power strategy requiring less recording power compared to said standard strategy until said tentative optimum recording power level becomes no higher than said allowable power level;

wherein said low-power strategy is a strategy obtained by increasing number of pulses of said standard strategy.

9. A data-recordable optical disk device, comprising:

means for setting a strategy;

means for recording test data on an optical disk using a standard strategy, wherein the standard strategy is determined based on a disk ID of said optical disk;

means for reproducing said test data;

means for setting a tentative optimum recording power level based on reproduced signal quality of said test data;

means for comparing said tentative optimum recording power level with an allowable power level; and means for setting recording power level which sets said tentative optimum recording power level as an authentic optimum recording power level when said tentative optimum recording power level does not exceed said allowable power level, and, when said tentative optimum recording power level exceeds said allowable power level, performs re-recording of said test data and resetting of optimum recording power level by setting a low-power strategy requiring less recording power compared to said standard strategy until said tentative optimum recording power level becomes no higher than said allowable power level;

wherein said low-power strategy is a strategy obtained by increasing a boost period of said standard strategy.

10. A data-recordable optical disk device, comprising:

means for detecting intensity of a returned recording laser beam from an optical disk when recording data using a first recording strategy;

control means for controlling recording power level such that said returned light intensity matches a target value;

means for changing said first recording strategy to a second recording strategy requiring less recording power when a recording power level required for said returned light intensity to match the target value exceeds an allowable power level;

means for storing a relationship between recording power level and reproduced signal quality for said second recording strategy; and calculating means for calculating a recording power level for said second recording strategy based on a recording power level for said first recording strategy; wherein said calculating means calculates, using said relationship, a recording power level which achieves reproduced signal quality under said second recording strategy equivalent to reproduced signal quality achieved at a recording power level under said first recording strategy.

11. A data-recordable optical disk device, comprising:

means for detecting intensity of a returned recording laser beam from an optical disk when recording data using a first recording strategy;

control means for controlling recording power level such that said returned light intensity matches a target value;

means for changing said first recording strategy to a second recording strategy requiring less recording power when a recording power level required for said returned light intensity to match the target value exceeds an allowable power level;

means for storing a relationship between recording power level and returned light intensity for said second recording strategy; and means for setting a new target value of returned light intensity for said second recording strategy; wherein said setting means sets said new target value using said relationship.

* * * * *

UNITED STATES PATENT AND TRADEMARK OFFICE
CERTIFICATE OF CORRECTION

PATENT NO. : 7,095,691 B2 Page 1 of 1
APPLICATION NO. : 10/232477
DATED : August 22, 2006
INVENTOR(S) : N. Takeda It is certified that error appears in the above-identified patent and that said Letters Patent is hereby corrected as shown below:

| COLUMN | LINE | ERROR |
| --- | --- | --- |
| Item (56) Pg. 1, col. 1 | Refs. Cited (U.S. Pats., Item 7) | "5,526,577 A * 6/1996 Nix" should read --5,528,577 A * 6/1996 Maenza-- |
| 16 (Claim 6, | 64 line 5) | "reciuiring" should read --requiring-- |

Signed and Sealed this

Twenty-seventh Day of March, 2007

JON W. DUDAS
*Director of the United States Patent and Trademark Office*